US009116649B2

(12) United States Patent
Ito

(10) Patent No.: US 9,116,649 B2
(45) Date of Patent: Aug. 25, 2015

(54) IMAGE FORMING APPARATUS WITH UNIT DETERMINING WHETHER OPERATION INFORMATION IS TRANSMITTED TO LOG STORAGE SERVER

(71) Applicant: CANON KABUSHIKI KAISHA, Tokyo (JP)

(72) Inventor: Yuki Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/298,337

(22) Filed: Jun. 6, 2014

(65) Prior Publication Data

US 2014/0376025 A1 Dec. 25, 2014

(30) Foreign Application Priority Data

Jun. 20, 2013 (JP) ................................. 2013-129234

(51) Int. Cl.

*G06K 15/00* (2006.01)
*G06F 3/12* (2006.01)
*H04N 1/32* (2006.01)

(52) U.S. Cl.

CPC ............ *G06F 3/1273* (2013.01); *G06F 3/1211* (2013.01); *G06F 3/1236* (2013.01); *G06F 3/1288* (2013.01); *H04N 1/32* (2013.01)

(58) Field of Classification Search

CPC .................... H04N 21/442; H04N 2201/0039; G06F 17/30082

USPC ...................... 358/1.14, 1.15; 726/1; 709/203

See application file for complete search history.

(56) References Cited

U.S. PATENT DOCUMENTS

| | | | | |
|---|---|---|---|---|
| 7,619,757 | B2 | 11/2009 | Okutsu et al. | 358/1.13 |
| 8,040,536 | B2 | 10/2011 | Ito et al. | 358/1.13 |
| 2007/0273921 | A1* | 11/2007 | Yamakawa | 358/1.15 |
| 2013/0227358 | A1* | 8/2013 | Yokokura | 714/57 |
| 2013/0242337 | A1* | 9/2013 | Miyamoto | 358/1.14 |

FOREIGN PATENT DOCUMENTS

JP 2007-323320 A 12/2007

* cited by examiner

*Primary Examiner* — Jacky X Zheng

(74) *Attorney, Agent, or Firm* — Fitzpatrick, Cella, Harper & Scinto

(57) ABSTRACT

A CPU of an image forming apparatus acquires a transmission instruction for a log, destination information on a WebDAV server, authentication information, and the like from a management server in accordance with a schedule set by the management server, determines whether or not special log information is to be transmitted to the WebDAV server in accordance with a link speed with respect to the WebDAV server, and notifies the management server of an error when it is determined that the special log information is not to be transmitted. Further, when it is determined that the special log information is to be transmitted, the CPU transmits the special log information to the WebDAV server by using the destination information and the authentication information.

12 Claims, 10 Drawing Sheets

401 402 403

| FILE NAME | WRITE TIME | TRANSMISSION TIME |
|---|---|---|
| LOG_PRINTER.TXT | 5/30/2013 20:03 | 5/30/2013 17:12 |
| LOG_FAX.TXT | 5/30/2013 20:03 | 5/30/2013 17:12 |
| LOG_USER.TXT | 5/30/2013 20:03 | 5/30/2013 17:12 |
| LOG_GENERAL.TXT | 5/30/2013 20:03 | 5/30/2013 17:12 |

```
<env:Envelope
Xmlns:env="http://schemas.xmlsoap.org/soap/envelope/"
Env:encodingStyle="http://schemas.xmlsoap.org/soap/encoding/">
  <env:Body>
    <ns:getLogCondition xmlns:ns="rdsgw">
      <client>
        <id>100</id>
        <type>typeA</type>
        <appVersion>1.00</appVersion>
      </client>
        <device>
          <mac>85:33:f2:2a</mac>
          <ip>192.168.0.1</ip>
          <serialNumber>serial:99345567</serialNumber>
          <productName>real new device..</productName>
          <type>typeA</type>
        </device>
    </ns:getLogCondition>
  </env:Body>
</env:Envelope>
```

702

704

```
<SOAP-ENV:Envelope xmlns:SOAP-
ENV="http://schemas.xmlsoap.org/soap/envelope"
Xmlns:xsi="http://www.w3.org/2001/XMLSchema-instance"
Xmlns:xsd="http://www.w3.org/2001/XMLSchema">
  <SOAP-ENV:Body>
    <ns:getLogConditionResponse xmlns:ns1="rdsgw"SOAP-
ENV:encodingStyl="http://schemas.xmlsoap.org/soap/encoding/">
      <available>1</available>
      <url>http://172.24.177.1/webdav</url>
      <id>aaaaaaaa</id>
      <pass>bbbbbbbb</pass>
    </ns:getLogConditionResponse>
  </SOAP-ENV:Body>
</SOAP-ENV:Envelope>
```

FIG. 11

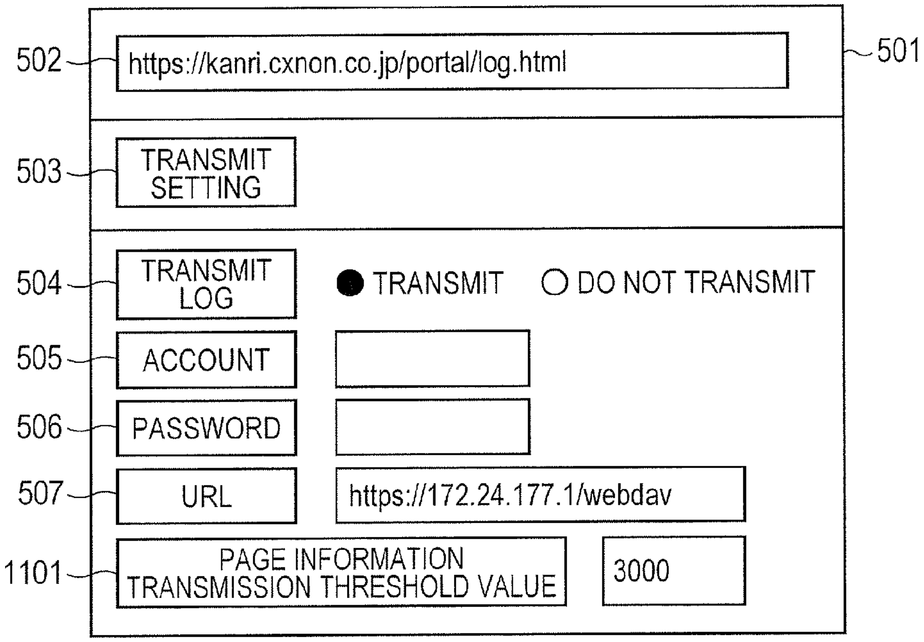

```
<SOAP-ENV:Envelope xmlns:SOAP-
ENV="http://schemas.xmlsoap.org/soap/envelope/"
Xmlns:xsi="http://www.3.org/2001/XMLSchema-instance"
Xmlns:xsd="http://www.3.org/2001/XMLSchema">
  <SOAP-ENV:Body>
    <ns:getLogConditionResponse xmlns:ns1="rdsgw"SOAP-
ENV:encodingStyl="http://schemas.xmlsoap.org/soap/encoding/">
      <available>1</available>
      <url>http://172.24.177.1/webdav</url>
      <id>aaaaaaaa</id>
      <pass>bbbbbbbb</pass>
    <threshold>3000</threshold> ~1202
    </ns:getLogConditionResponse>
  </SOAP-ENV:Body>
</SOAP-ENV:Envelope>
```

IMAGE FORMING APPARATUS WITH UNIT DETERMINING WHETHER OPERATION INFORMATION IS TRANSMITTED TO LOG STORAGE SERVER

BACKGROUND OF THE INVENTION

1. Field of the Invention

The present invention relates to control of an image forming apparatus to be connected to a network.

2. Description of the Related Art

In recent years, a system for quickly confirming log information by transmitting various logs saved inside an image forming apparatus to a server and accessing the server from a remote site is under development. For example, a system for handling an image log such as a security monitoring system, a system for handling a sequence log used to detect a failure in the image forming apparatus itself, and other such systems are under development.

Japanese Patent Application Laid-Open No. 2007-323320 discloses a technology in which a client downloads a log transmission interval from an authentication server provided separately from a log collection server and transmits a log to the log collection server.

However, the related art has a problem in that, when a log existing in the image forming apparatus is transmitted at a maximum transfer rate, communications other than log transmission become slower with an excessive network bandwidth occupied. There is another problem in that the printing processing or UI processing becomes slower because a CPU load on the image forming apparatus becomes too heavy due to the log transmission.

SUMMARY OF THE INVENTION

It is an object of the present invention to provide a mechanism for preventing communications other than log transmission from becoming slower due to an influence of the log transmission, and further capable of suppressing the influence of the log transmission exerted on other processing.

To achieve the object, the present invention provides an image forming apparatus, which is configured to communicate to/from a management server for managing operation information on multiple image forming apparatus, the image forming apparatus comprising: a transmission unit configured to transmit a first piece of operation information of the image forming apparatus to the management server in accordance with a schedule set by the management server; a reception unit configured to receive, from the management server, (a) a transmission instruction for a second piece of operation information, (b) destination information on a log storage server to which the second piece of operation information is to be transmitted, the log storage server being different from the management server, and (c) authentication information; a determination unit configured to determine, in accordance with a link speed with respect to the log storage server, whether or not the second piece of operation information is to be transmitted to the log storage server; and a notification unit configured to notify the management server of an error when the determination unit determines that the second piece of operation information is not to be transmitted to the log storage server, wherein the transmission unit is further configured to: transmit, when the determination unit determines that the second piece of operation information is to be transmitted to the log storage server, the second piece of operation information of the image forming apparatus to the log storage server by using the destination information and the authentication information in accordance with reception of the transmission instruction for the second piece of operation information; and control a transfer rate so that the transfer rate is prevented from exceeding a predetermined value when the second piece of operation information is transmitted.

Further features of the present invention will become apparent from the following description of exemplary embodiments with reference to the attached drawings.

BRIEF DESCRIPTION OF THE DRAWINGS

FIG. 7 is a diagram exemplifying XML/SOAP data for acquiring a log setting status according to the first embodiment.

FIG. 11 is a diagram exemplifying a UI of a PC for setting log transmission conditions for an image forming apparatus according to a second embodiment of the present invention.

FIG. 12 is a diagram exemplifying XML/SOAP data for acquiring a log setting status according to the second embodiment.

DESCRIPTION OF THE EMBODIMENTS

Preferred embodiments of the present invention will now be described in detail in accordance with the accompanying drawings.

First Embodiment

Figure 1:
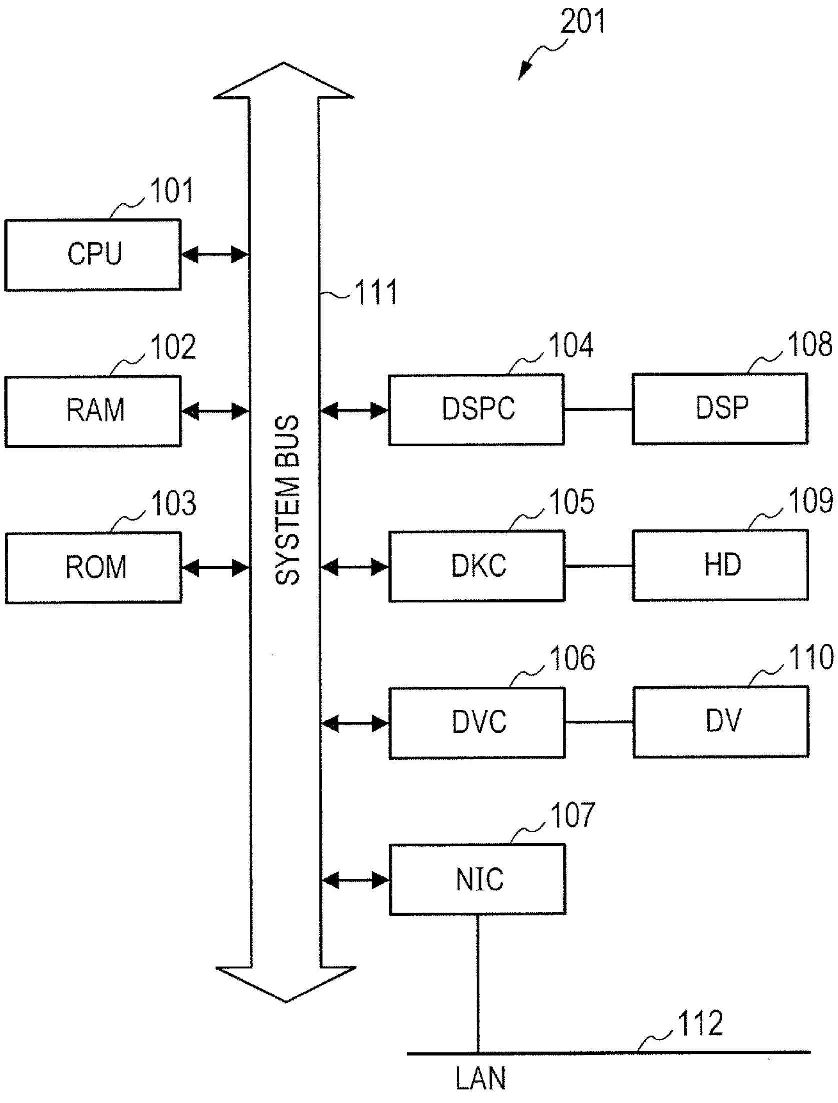
FIG. 1 is a diagram exemplifying an internal configuration of an image forming apparatus according to a first embodiment of the present invention.

FIG. 1 is a diagram illustrating an example of an internal configuration of an image forming apparatus according to a first embodiment of the present invention. Note that, here, as an example, the image forming apparatus configured so that a network control unit and a device (printer) control unit run on one CPU is described, but the present invention is not limited thereto.

FIG. 1 illustrates an image forming apparatus 201 according to this embodiment. A CPU 101 executes a program stored in a ROM 103, and integrally controls respective devices connected to a system bus 111. A RAM 102 functions as a main memory of the CPU 101, a work area therefor, or the like. Further, the RAM 102 also forms a backup RAM for saving a log transmission condition table or the like for storing log transmission conditions described later. The ROM 103 stores the program executed by the CPU 101, various kinds of necessary data, and the like.

A display controller (DSPC) 104 controls display of a display (DSP) 108. A copy setting screen and the like are displayed on the DSP 108, and a user can perform settings for copying or the like through the copy setting screen. A disk controller (DKC) 105 controls a hard disk drive (HD) 109 for saving a log described later, an image, and various kinds of user data.

A device controller (DVC) 106 controls a device (DV) 110 such as a printer or a scanner. A network interface card (NIC) 107 can perform communications to/from various server devices described later through a local network (LAN) 112.

Note that, a keyboard is not provided in the example illustrated in FIG. 1, but it should be understood that a keyboard may be provided. Further, in place of the HD 109, another storage device such as a solid-state drive (SSD) may be used. For example, in place of the HD 109, a USB memory or the like may be used. Further, the log transmission condition table or the like may be saved in another storage device such as the HD 109 instead of the backup RAM.

Figure 2:
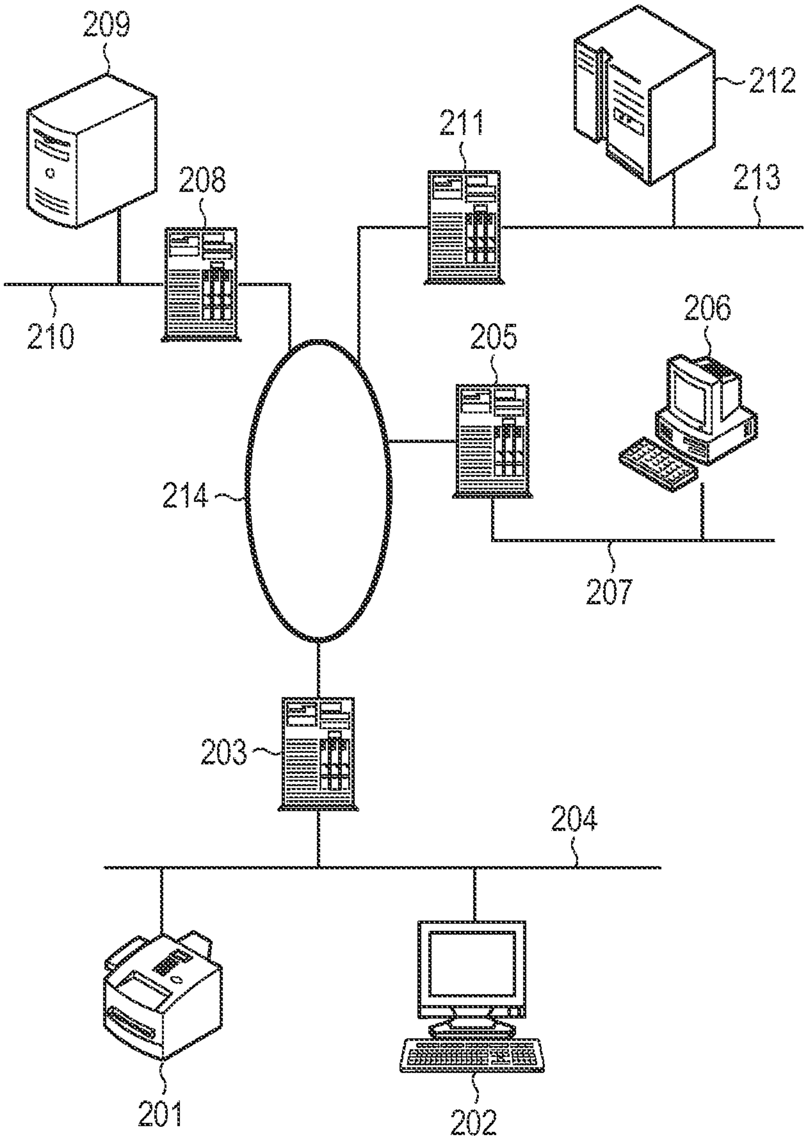
FIG. 2 is a diagram exemplifying an overall configuration of a system according to the first embodiment of the present invention.

FIG. 2 is a diagram illustrating an example of an overall configuration of a system according to the first embodiment of the present invention.

A personal computer (PC) 202 can perform printing and status monitoring for the image forming apparatus 201. FIG. 2 illustrates LANs 204, 207, 210, and 213 and the entire Internet 214. Proxy servers 203, 205, 208, and 211 are connected to the Internet as proxy for devices on the LANs 204, 207, 210, and 213, respectively.

A management server 209 controls error monitoring, arrangements for maintenance, inventory management depending on an installed environment, or the like for the image forming apparatus 201. A WebDAV server 212 is a log storage server for storing special log information (second piece of operation information) transmitted from the image forming apparatus 201 by using a WebDAV protocol. Note that, the WebDAV protocol is a function as an extension of an HTTP protocol, which has a high level of security, and is therefore considered as an optimal protocol for use on the Internet. A PC 206 allows use of a Web browser. The PC 206 can access the management server 209 and the WebDAV server 212.

Here, the special log information stored in the WebDAV server 212 is log information for recording, for example, not only an occurrence of a failure but also details of various kinds of processing such as the user's operation and a system operation. Such log information is used for a detailed analysis or the like by a developer at a manufacturer of the image forming apparatus 201 or the like. Further, the special log information is considered as log information having an extremely much larger amount of information than an alarm log, a job log, or the like.

Note that, in this embodiment, an Internet environment is employed, but the Internet environment is not essential, and a proxy server is not necessarily provided. Further, only one image forming apparatus 201 is illustrated, but multiple image forming apparatus 201 may be provided, and a normal system includes multiple image forming apparatus 201. The number of respective devices and the number of PCs are not limited to those of this embodiment. Further, in this embodiment, a WebDAV server using the WebDAV protocol is provided as the log storage server, but a server using a protocol (for example, SMB or FTP) other than the WebDAV protocol may be provided.

Figures 3, 4:
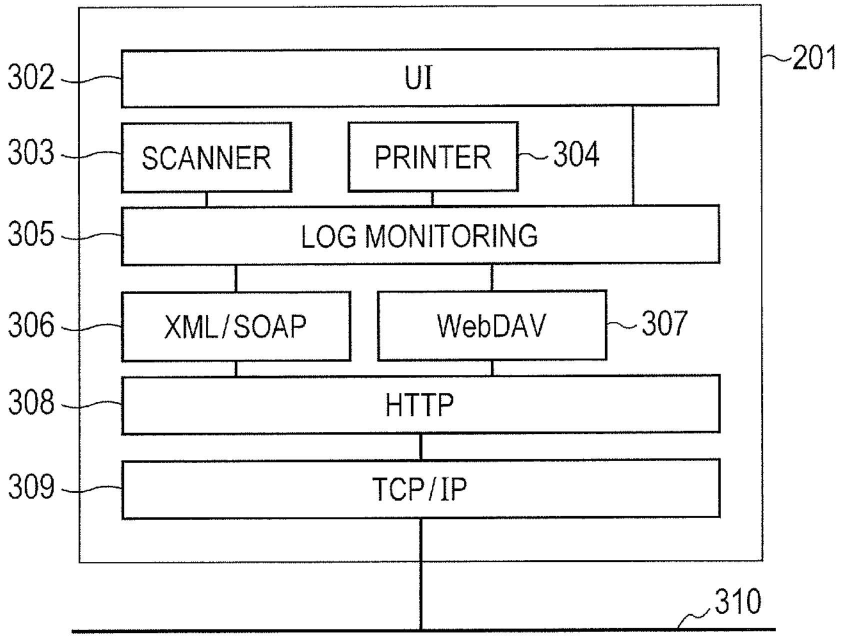
FIG. 3 is a diagram exemplifying an internal module configuration of the image forming apparatus according to the first embodiment.
FIG. 4 is a table exemplifying a log list of the image forming apparatus according to the first embodiment.

FIG. 3 is a diagram illustrating an example of an internal module configuration of the image forming apparatus 201.

In FIG. 3, a UI 302 is a user interface. A scanner apparatus 303 and a printer apparatus 304 correspond to, for example, the DV 110 illustrated in FIG. 1.

A log monitoring module 305 is, for example, a module for monitoring whether or not a log is written in the HD 109. An XML/SOAP 306 is a module for controlling a procedure for communications to/from the management server 209. A WebDAV client module 307 is a module for controlling a procedure for communications to/from the WebDAV server 212.

An HTTP client module 308 is a module for controlling the HTTP protocol. A TCP/IP 309 is a protocol stack of the TCP/IP. A network 310 corresponds to, for example, the LANs 204, 207, 210, and 213 illustrated in FIG. 2.

Further, the log monitoring module 305 has a function of transmitting operation information incorporated in the image forming apparatus 201. The log monitoring module 305 transmits counter information on the image forming apparatus 201, an alarm log, or the like via SOAP to the management server 209 in accordance with a schedule designated by the management server 209. In addition, the log monitoring module 305 has a function of transmitting the special log information used for a detailed analysis and the like of an operation of a device separately to the WebDAV server 212 different from the management server 209.

Note that, in the present invention, peripheral apparatus such as the copier, the scanner, and the printer are provided as the image forming apparatus, but the present invention is not particularly limited thereto. Further, each kind of protocol described here is merely an example, and the present invention is not limited thereto.

FIG. 4 is a table showing an example of a log list of the image forming apparatus 201.

In FIG. 4, a file name 401 indicates a file name of a log. A write time 402 indicates a date/time at which the log is created and a date/time at which the log is updated. A transmission time 403 indicates a date/time at which the log is transmitted to the WebDAV server 212. The write time 402 and the transmission time 403 serve as a reference with which it is determined whether or not to transmit the log, and when the write time 402 is a date/time later than the transmission time 403, the log needs to be transmitted. Note that, the log list shown in FIG. 4 is stored in the HD 109 of the image forming apparatus 201, and is updated by the CPU 101 each time the log is written or transmitted.

Note that, this example is merely an example, the file name 401, the write time 402, and the transmission time 403 are also merely examples, and the present invention is not limited thereto. Further, the date/time may be included in the file name of the log to allow a write time to be determined from the file name. Further, a list of file names may be acquired from the WebDAV server 212 to inhibit the log having the same file name from being transmitted.

Figure 5:
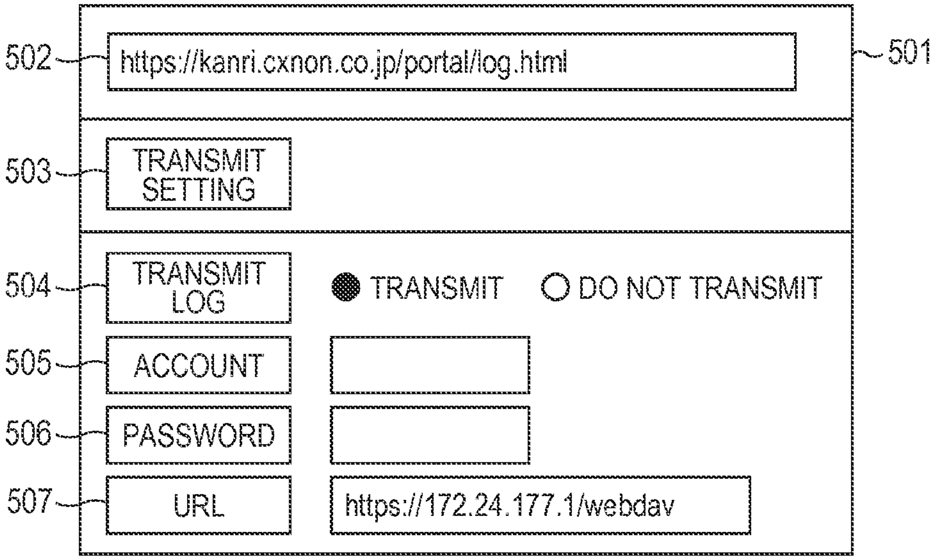
FIG. 5 is a diagram exemplifying a UI of a PC for setting log transmission conditions for the image forming apparatus according to the first embodiment.

FIG. 5 is a diagram illustrating an example of a user interface (UI) of a PC for setting transmission conditions (log transmission conditions) for the above-mentioned special log information for the image forming apparatus 201 according to the first embodiment.

In FIG. 5, a browser 501 is a browser on the PC 206 accessing the management server 209. A URL 502 indicates a URL of a Web portal being accessed by the browser 501. By pressing a setting transmission button 503, setting data on the log transmission conditions to be set by fields 504 to 507 can be transmitted to the management server 209.

The field 504 is a selection field for setting an instruction (transmission instruction for a log) as to whether or not to transmit the log. The field 505 is an input field for setting an account for access to the WebDAV server. The field 506 is an input field for setting a password corresponding to the account input to the field 505. The field 507 is an input field for setting a URL (destination information on the log storage server) of the WebDAV server 212.

The transmission instruction for the log is selected in the above-mentioned field 504, authentication information (in this example, account and password) on the log storage server to which the log is to be transmitted is input to the fields 505 and 506, and the destination information on the log storage server (in this example, URL thereof) is input to the field 507. Then, the log transmission conditions can be set by pressing the setting transmission button 503. The log transmission conditions are held in the management server 209, and are transmitted from the management server 209 to the image forming apparatus 201 in accordance with a request received from the image forming apparatus 201. Note that, this example is merely an example, and the present invention is not limited thereto as long as an intended instruction can be set for the image forming apparatus 201.

Figure 6:
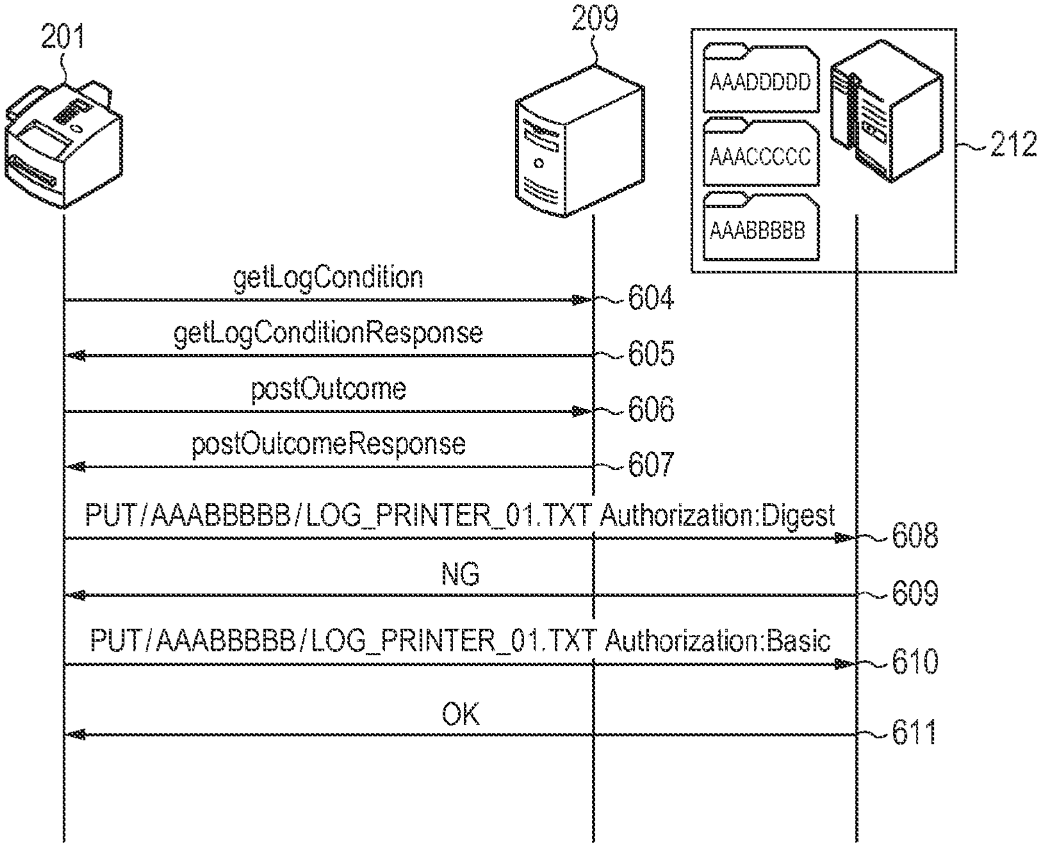
FIG. 6 is a diagram exemplifying a communication sequence of a network according to the first embodiment.

FIG. 6 is a diagram illustrating an example of a communication sequence of the network according to this embodiment.

The image forming apparatus 201 is an image forming apparatus managed by the management server 209. The image forming apparatus 201 regularly acquires the setting status of the log transmission conditions from the management server 209. The image forming apparatus 201 acquires the setting status of the log transmission conditions from the management server 209, for example, in accordance with a schedule (every 12 hours or the like) set by the management server 209. Further, based on the setting status of the log transmission conditions acquired from the management server 209, the image forming apparatus 201 transmits the log to a folder having a folder name of a serial number (here, AAABBBBB) of the own device within the WebDAV server 212.

Now, communications of the image forming apparatus 201 to/from the management server 209 and the WebDAV server 212 are described in detail.

First, in order to periodically acquire the setting status of the log transmission conditions, with getLogCondition 604, the image forming apparatus 201 requests the management server 209 for the setting status from the management server 209. At this time, the image forming apparatus 201 transmits, for example, XML/SOAP data 701 illustrated in FIG. 7 to the management server 209. Then, with getLogConditionResponse 605, the management server 209 returns the setting status of the log transmission conditions to the image forming apparatus 201. At this time, the management server 209 returns, for example, XML/SOAP data 702 illustrated in FIG. 7 to the image forming apparatus 201.

Further, with postOutcome 606, the image forming apparatus 201 notifies the management server 209 whether log transmission processing is to be continued or canceled. The management server 209 returns postOutcomeResponse 607 to the image forming apparatus 201 in response to postOutcome 606.

Further, with PUT 608 of WebDAV, the image forming apparatus 201 transmits the log file including the above-mentioned special log information to the WebDAV server 212. An authentication method used here is a digest authentication. When receiving PUT 608, the WebDAV server 212 performs the authentication processing, and in this example, it is assumed that the authentication fails. When the authentication fails, the WebDAV server 212 returns NG 609 to the image forming apparatus 201 in response to PUT 608.

The image forming apparatus 201, which has received NG 609, then transmits the log file again to the WebDAV server 212 with PUT 610 of WebDAV. The authentication method used here is a basic authentication. In this example, it is assumed that the authentication is successful. When the authentication is successful, the WebDAV server 212 returns OK 611 to the image forming apparatus 201 in response to PUT 610.

The digest authentication and the basic authentication are both general authentication methods, and hence detailed sequences thereof are omitted. It is assumed that the image forming apparatus 201 according to this embodiment attempts a connection by a second authentication method when the connection fails by a first authentication method. By using such a method, the image forming apparatus 201 can have the connection without recognizing which authentication method the WebDAV server 212 is compatible with.

Note that, in this example, the sequence of WebDAV is illustrated, but another original protocol such as FTP or SMB may be employed. Further, in this example, the log of the device is identified by providing the folder having the serial number, but any other information that can be uniquely identified, such as a MAC address, may be used.

FIG. 7 is a diagram illustrating an example of XML/SOAP data for acquiring a log setting status according to the first embodiment.

The XML/SOAP data 701 is an example of the XML/SOAP data on getLogCondition 604 illustrated in FIG. 6. In the XML/SOAP data 701, as illustrated in a part 703, information for identifying the image forming apparatus 201 such as a client identifier, a MAC address, an IP address, a serial number, and a product name is transmitted together. Note that, the XML/SOAP data 701 may be transmitted by including therein counter information, an alarm log, and the like of the image forming apparatus 201 as the operation information on the image forming apparatus 201.

The XML/SOAP data 702 is an example of the XML/SOAP data on getLogConditionResponse 605 serving as a response to getLogCondition 701. The XML/SOAP data 702 includes, as illustrated in a part 704, the log transmission instruction, the account, the password, and the description of the URL such as the one set in FIG. 5. Note that, the log transmission instruction is described by being sandwiched between <available> tags. The account, the password, and the URL are described by being sandwiched between <id> tags, <pass> tags, and <url> tags, respectively.

Note that, in this example, XML/SOAP is used as an example, but another data structure may be used. Further, even with XML/SOAP, the present invention is not limited to this example as long as XML data has the same meaning.

Now, an operation for acquiring the log setting status of the image forming apparatus 201 is described with reference to FIG. 8.

Figure 8:
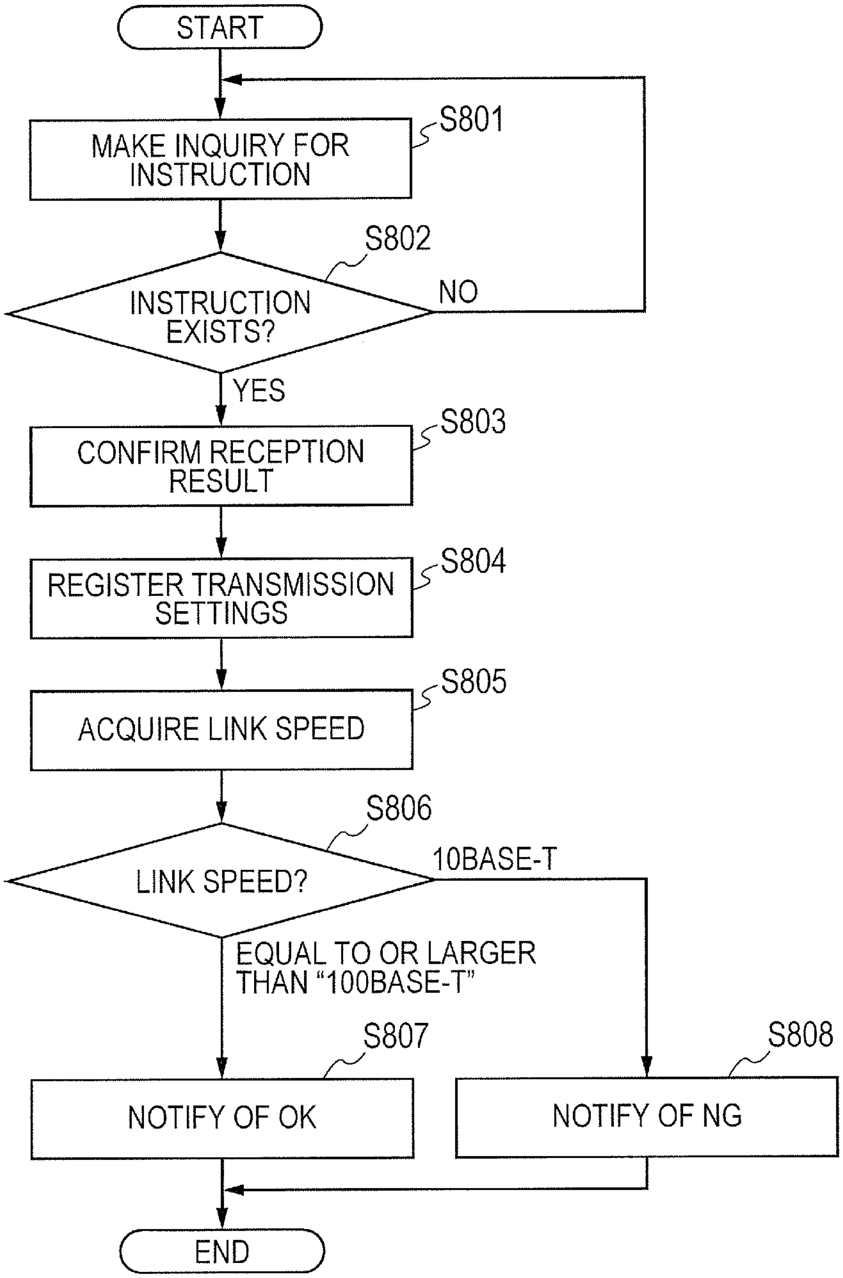
FIG. 8 is a flowchart exemplifying processing for acquiring the log setting status according to the first embodiment.

FIG. 8 is a flowchart illustrating an example of processing for acquiring the log setting status according to the first embodiment of the present invention. Note that, the processing of this flowchart is realized by the CPU 101 reading and executing the program stored in the ROM 103.

The CPU 101 executes the processing of this flowchart in accordance with a schedule set by the management server 209.

First, in Step S801, the CPU 101 transmits getLogCondition to the management server 209, and acquires the setting status of the log transmission conditions (including the transmission instruction for the log) to make an inquiry for the transmission instruction for the log. When receiving getLogConditionResponse from the management server 209, the CPU 101 advances the processing to Step S802.

In Step S802, the CPU 101 determines whether or not the transmission instruction for the log described in getLogConditionResponse exists. Note that, when "<available>1</available>" is described in getLogConditionResponse, it is determined that "the instruction exists". On the other hand, when "<available>0</available>" is described, it is determined that "the instruction does not exist". When it is determined that "the instruction does not exist" ("No" in Step S802), the CPU 101 returns the processing to Step S801. On the other hand, When it is determined that "the instruction exists" ("Yes" in Step S802), the CPU 101 advances the processing to Step S803.

In Step S803, the CPU 101 confirms the setting status of the log transmission conditions described in getLogConditionResponse. In this example, the CPU 101 confirms the destination information on the log storage server (URL of the WebDAV server 212) and the authentication information (account and password).

Subsequently, in Step S804, the CPU 101 registers, in the image forming apparatus 201, the setting status of the log transmission conditions confirmed in Step S803 as transmission settings. For example, the CPU 101 stores the setting status of the log transmission conditions into the log transmission condition table stored in the backup RAM of the RAM 102.

Subsequently, in Step S805, the CPU 101 inquires of the TCP/IP protocol stack 309, to thereby acquire a link speed with respect to the WebDAV server 212. Subsequently, in Step S806, the CPU 101 determines a value of the link speed acquired in Step S805. When it is determined that the link speed is equal to or larger than "100BASE-T" (equal to or larger than "100BASE-T" in Step S806), the CPU 101 advances the processing to Step S807. On the other hand, when it is determined that the link speed is "10BASE-T" ("10BASE-T" in Step S806), the CPU 101 advances the processing to Step S808.

In Step S807, with postOutcome 606 illustrated in FIG. 6, the CPU 101 notifies the management server 209 of "OK" indicating that the processing for log transmission to the WebDAV server 212 is to be continued. On the other hand, in Step S808, with postOutcome 606 illustrated in FIG. 6, the CPU 101 notifies the management server 209 of "NG" indicating that the processing for the log transmission to the WebDAV server 212 is to be canceled. In other words, the CPU 101 notifies the management server 209 of an error. When the notification is completed in Step S807 or Step S808, the CPU 101 brings the processing of this flowchart to an end. The notification allows the management server 209 to recognize whether the image forming apparatus 201 is to continue or cancel the processing for the log transmission. Note that, when "OK is notified of" in Step S807, the CPU 101 executes transmission processing for the special log information described later with reference to FIG. 9.

Note that, in this embodiment, it is determined whether or not to transmit the log based on the link speed, but even when the link speed is low, the log may be transmitted by reducing (changing) the number of log files to be transmitted. For example, when the link speed is "10BASE-T", the CPU 101 may be configured to transmit only one most recent log file.

Further, this embodiment is described by taking the example in which the determination is performed based on whether or not the link speed is equal to or larger than "100BASE-T", but the condition for the link speed for continuing the processing for the log transmission is not limited to equal to or larger than "100BASE-T". The CPU 101 may be configured to determine whether or not to continue or cancel the processing for the log transmission by using a predetermined link speed as a threshold value.

Now, an operation for transmitting the above-mentioned special log information which is performed by the image forming apparatus 201 is described with reference to FIG. 9.

Figure 9:
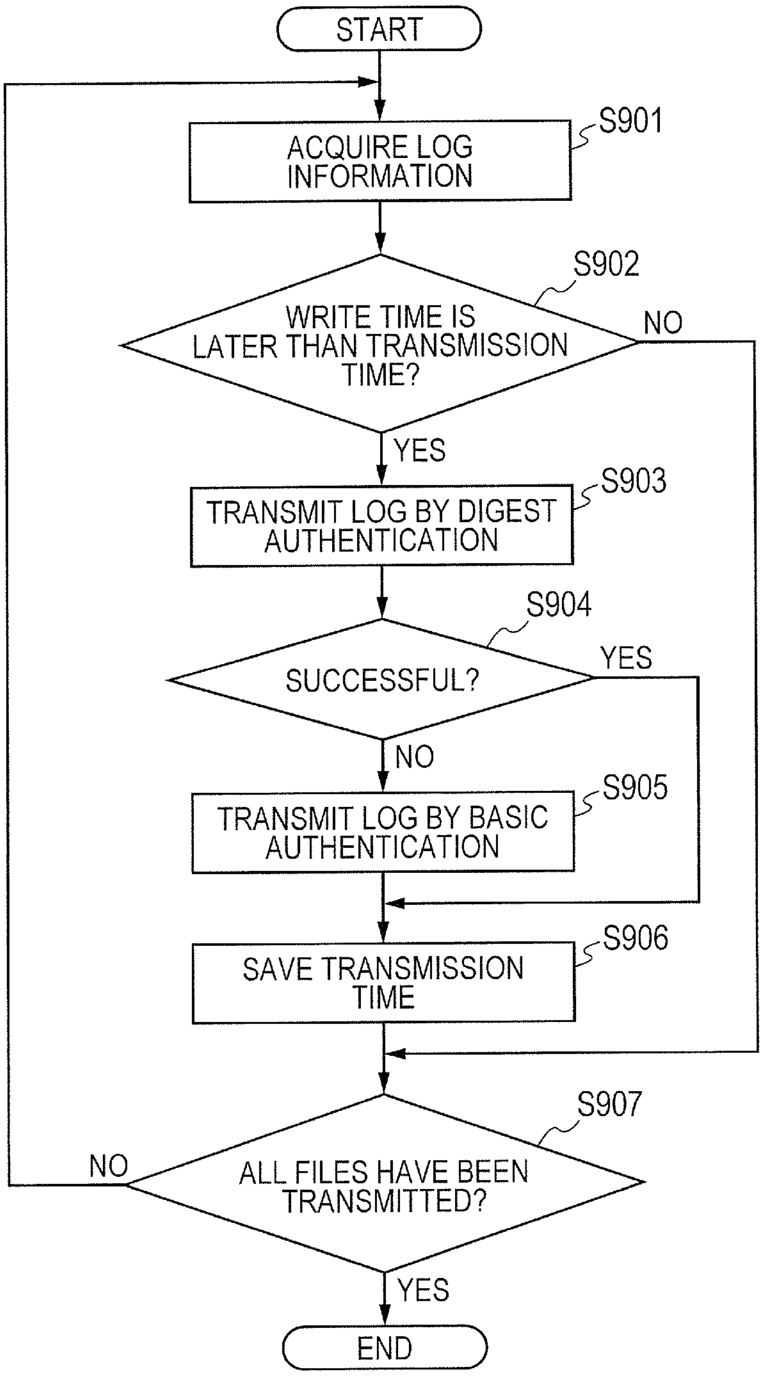
FIG. 9 is a flowchart exemplifying log transmission processing according to the first embodiment.

FIG. 9 is a flowchart illustrating an example of the log transmission processing according to this embodiment. Note that, the processing of this flowchart is realized by the CPU 101 reading and executing the program stored in the ROM 103.

When "OK is notified of" in Step S807 illustrated in FIG. 8, the CPU 101 executes the processing of this flowchart.

First, in Step S901, the CPU 101 acquires, for example, the log information shown in FIG. 4 from the HD 109. Subsequently, in Step S902, the CPU 101 determines whether or not the write time 402 is later than the transmission time 403. When it is determined that the write time 402 is later than the transmission time 403 ("Yes" in Step S902), the CPU 101 advances the processing to Step S903. On the other hand, when it is determined that the write time 402 is not later than the transmission time 403 ("No" in Step S902), the CPU 101 advances the processing to Step S907.

In Step S903, the CPU 101 transmits the log to the WebDAV server 212 by the digest authentication in the same manner as in PUT 608 illustrated in FIG. 6. Subsequently, in Step S904, the CPU 101 receives the response from the WebDAV server 212, and determines from the response whether or not the log transmission is successful. When it is determined that the log transmission is successful ("Yes" in Step S904), the CPU 101 advances the processing to Step S906. On the other hand, when it is determined that the log transmission has failed ("No" in Step S904), the CPU 101 advances the processing to Step S905.

In Step S905, the CPU 101 transmits the log to the WebDAV server 212 by the basic authentication in the same manner as in PUT 610 illustrated in FIG. 6, and advances the processing to Step S906.

In Step S906, the CPU 101 saves a transmission time. Subsequently, in Step S907, the CPU 101 determines whether or not all the log files have been transmitted. When it is determined that there is still a log file to be transmitted ("No" in Step S907), the CPU 101 returns the processing to Step S901. On the other hand, when it is determined that all the log files have been transmitted ("Yes" in Step S907), the CPU 101 brings the processing of this flowchart to an end.

Note that, when the log transmission is performed in Step S903 and Step S905 illustrated in FIG. 9, the CPU 101 transmits the log while executing transfer rate control described below with reference to FIG. 10.

Now, a transfer rate control operation for the log transmission which is performed by the image forming apparatus according to this embodiment is described with reference to FIG. 10.

Figure 10:
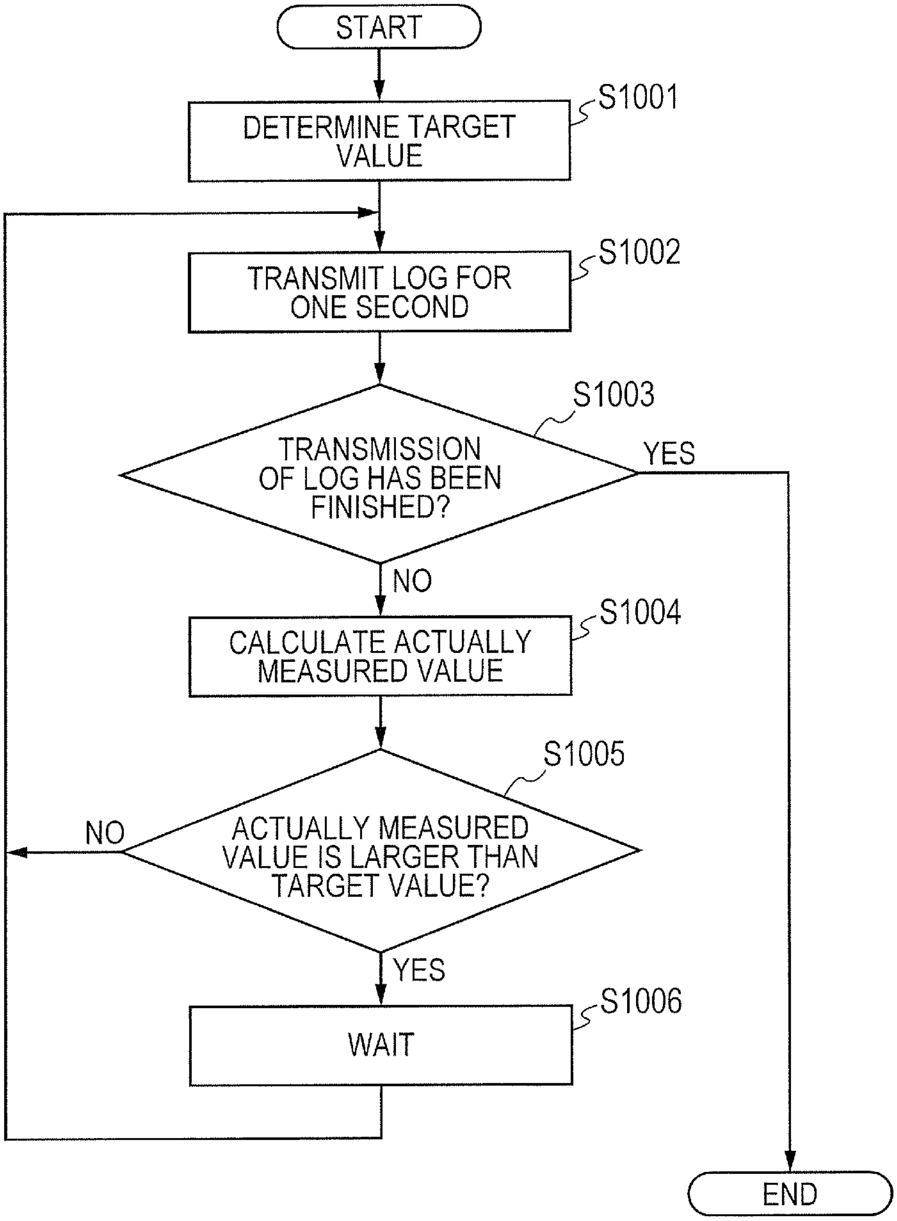
FIG. 10 is a flowchart exemplifying transfer rate control for the log transmission according to the first embodiment.

FIG. 10 is a flowchart illustrating an example of the transfer rate control for the log transmission according to this embodiment. Note that, the processing of this flowchart is realized by the CPU 101 reading and executing the program stored in the ROM 103.

In Step S1001, the CPU 101 determines a target value of a transfer rate. In this embodiment, the link speed is set to "100BASE-T", and the target value of the transfer rate is determined as "1 MByte/s" so that a bandwidth usage rate is approximately "10 percent". It is assumed that this target value is determined based on, for example, settings performed through the UI 302 by an administrator or the like of the image forming apparatus 201, settings performed through the UI illustrated in FIG. 5, or other such settings.

Subsequently, in Step S1002, the CPU 101 transmits the log to the WebDAV server 212 for one second. Subsequently, in Step S1003, the CPU 101 determines whether or not the transmission of one log file has been finished in transmission processing of Step S1002. When it is determined that the transmission of one log file has been finished ("Yes" in Step S1003), the CPU 101 brings the processing of this flowchart to an end. On the other hand, when the transmission of one log file has not been finished ("No" in Step S1003), the CPU 101 advances the processing to Step S1004.

In Step S1004, the CPU 101 calculates an actually measured value of the transfer rate from a size of log files transmitted for one second as described above. Subsequently, in Step S1005, the CPU 101 determines whether or not the actually measured value calculated in Step S1004 is larger than the target value. When it is determined that the actually measured value is not larger than the target value ("No" in Step S1005), the CPU 101 returns the processing to Step S1002. On the other hand, when it is determined that the actually measured value is larger than the target value ("Yes" in Step S1005), the CPU 101 advances the processing to Step S1006.

In Step S1006, the CPU 101 calculates a wait time necessary for the transfer rate to become "1 MByte/s", actually stands by for the calculated wait time, and returns the processing to Step S1002. When the transmission of one log file is finished (Yes in Step S1003), the processing of this flowchart is brought to an end. In other words, the CPU 101 controls the transfer rate so as not to exceed the target value when the log is transmitted. Note that, the present invention is not limited to the method according to this embodiment as long as the CPU 101 controls the transfer rate so as not to exceed the target value in the method.

As described above, according to the image forming apparatus of this embodiment, the log transmission is performed so as not to occupy a network bandwidth, to thereby be able to prevent the communications other than the log transmission from becoming slow. Further, the load on the CPU 101 can be reduced, which can suppress an influence on other processing performed by the CPU 101. For example, it is possible to prevent the printing processing or UI processing from becoming slow due to an increase in the load of the log transmission exerted on the CPU 101.

Note that, in the example of FIG. 8, the CPU 101 is configured to determine whether or not the log transmission to the WebDAV server 212 is to be continued when receiving the transmission instruction (to transmit) for the log from the management server 209, to thereby control whether or not to execute the log transmission processing (FIG. 9). However, the CPU 101 may be configured to determine whether or not the log transmission to the WebDAV server 212 is to be continued irrespective of the content (to transmit or not to transmit) of the transmission instruction for the log received from the management server 209. Then, the CPU 101 may be configured to transmit the log to the WebDAV server 212 by using the destination information and the authentication information included in the log transmission conditions in accordance with the transmission instruction "to transmit" for the log included in the log transmission conditions, in other words, the log transmission instruction.

Second Embodiment

Next, a second embodiment of the present invention is described.

In the first embodiment, all the logs that have not yet been transmitted are transmitted when the above-mentioned special log information exists in the image forming apparatus 201. In this embodiment, the number of log files generated on the current day is examined before the log transmission to the WebDAV server 212, and when the number of generated log files exceeds a threshold value, the log transmission to the WebDAV server 212 is performed.

For example, as one piece of the log information, there is page information one file of which is generated each time copying or printing is carried out. When a log such as a page information log is transmitted from all the image forming apparatus existing in a network environment, the load on the WebDAV server 212 becomes heavy, and hence there is a demand that a limitation be imposed on the number of image forming apparatus that performs the log transmission. The log information on the image forming apparatus performing a large volume of printing is more useful for a log analysis, and hence the log transmission may be performed by only the image forming apparatus in which a large amount of log files are being generated. Note that, in this embodiment, only different parts from the first embodiment are described while omitting descriptions related to the same parts as the first embodiment.

FIG. 11 is a diagram illustrating an example of a user interface (UI) of a PC for setting log transmission conditions for the image forming apparatus 201 according to the second embodiment.

In FIG. 11, a field 1101 is an input field for inputting a page information transmission threshold value indicating a condition for transmitting the page information. In this embodiment, for example, "3,000" is input to the field 1101 in order to acquire the page information on the image forming apparatus printing at least 3,000 pages per day.

FIG. 12 is a diagram illustrating an example of XML/SOAP data for acquiring a log setting status according to the second embodiment.

In FIG. 12, XML/SOAP data 1201 is an example of the XML/SOAP data on getLogConditionResponse 605 serving as a response to getLogCondition 701 illustrated in FIG. 7. In the XML/SOAP data 1201, as illustrated in a part 1202, the page information transmission threshold value such as the one set in the field 1101 of FIG. 11 is described by being sandwiched between <threshold> tags.

Note that, in this embodiment, the image forming apparatus 201 acquires the page information transmission threshold value as the XML data, but the user may be allowed to input the page information transmission threshold value to the image forming apparatus 201 by using the UI 302 of the image forming apparatus 201.

Now, an operation for acquiring the log setting status of the image forming apparatus 201 according to the second embodiment is described with reference to FIG. 13.

Figure 13:
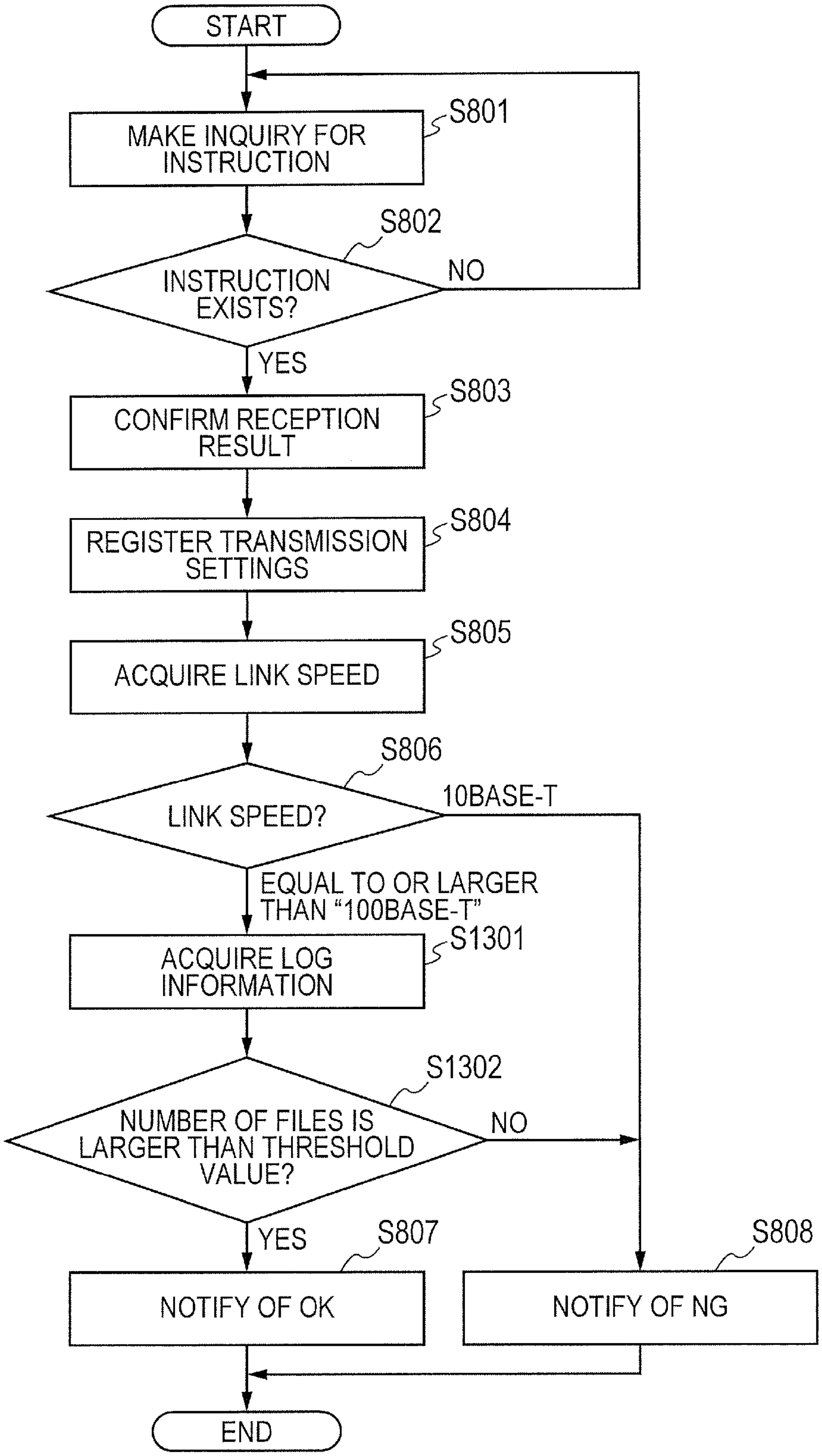
FIG. 13 is a flowchart exemplifying processing for acquiring the log setting status according to the second embodiment.

FIG. 13 is a flowchart illustrating an example of processing for acquiring the log setting status according to the second embodiment of the present invention. Note that, the processing of this flowchart is realized by the CPU 101 reading and executing the program stored in the ROM 103.

The CPU 101 executes the processing of this flowchart in accordance with a schedule set by the management server 209. The processing from Steps S801 to S806 is the same as that of FIG. 8, and hence the description thereof is omitted.

In Step S1301, the CPU 101 acquires the log information as shown in FIG. 4, and examines the number of files generated within a specific period (for example, within one day) from the write time 402. Subsequently, in Step S1302, the CPU 101 determines whether or not the number of files generated within one day, which is examined in Step S1301, is larger than the page information transmission threshold value.

When it is determined that the number of files generated within one day is larger than the page information transmission threshold value ("Yes" in Step S1302), the CPU 101 advances the processing to Step S807. On the other hand, when it is determined that the number of files generated within one day is not larger than the page information transmission threshold value ("No" in Step S1302), the CPU 101 advances the processing to Step S808.

In Step S807, with postOutcome 606 illustrated in FIG. 6, the CPU 101 notifies the management server 209 of "OK" indicating that the processing for log transmission to the WebDAV server 212 is to be continued. On the other hand, in Step S808, with postOutcome 606 illustrated in FIG. 6, the CPU 101 notifies the management server 209 of "NG" indicating that the processing for the log transmission to the WebDAV server 212 is to be canceled. Then, the CPU 101 brings the processing of this flowchart to an end.

As described above, according to this embodiment, the image forming apparatus from which the log transmission is to be continued is limited to the image forming apparatus in which the number of log files is large (exceeds the threshold value), to thereby be able to suppress the load on the WebDAV server 212 for storing the log and the load on the network.

As described above, according to the embodiments of the present invention, the link speed is determined, and it is determined whether or not to transmit the log based on the link speed. Further, when the transfer rate exceeds the threshold value, a bandwidth load and a CPU load can be suppressed by performing the log transmission while inhibiting the transfer rate from exceeding the threshold value. In this manner, the log transmission is performed from the image forming apparatus so as not to occupy the network bandwidth, to thereby be able to prevent the communications other than the log transmission from becoming slow due to the influence of the log transmission. Further, the CPU load on the image forming apparatus during the log transmission can be reduced, which can suppress the influence of the log transmission exerted on other processing.

The present invention is not limited to the above-mentioned embodiments. Various modifications (including an organic combination of the respective embodiments) can be made based on the gist of the present invention, and those various modifications are not to be excluded from the scope of the present invention. In other words, all configurations that combine the above-mentioned respective embodiments with modification examples thereof are also included in the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-129234, filed Jun. 20, 2013, which is hereby incorporated by reference herein in its entirety.

What is claimed is:

1. An image forming apparatus, which is configured to communicate to/from a management server for managing operation information on multiple image forming apparatus, the image forming apparatus comprising:

a transmission unit configured to transmit a first piece of operation information of the image forming apparatus to the management server in accordance with a schedule set by the management server;

a reception unit configured to receive from the management server (a) a transmission instruction for a second piece of operation information, (b) destination information on a log storage server to which the second piece of operation information is to be transmitted, the log storage server being different from the management server, and (c) authentication information;

a determination unit configured to determine in accordance with a link speed with respect to the log storage server whether or not the second piece of operation information is to be transmitted to the log storage server; and a notification unit configured to notify the management server of an error when the determination unit determines that the second piece of operation information is not to be transmitted to the log storage server, wherein the transmission unit is further configured to transmit the second piece of operation information of the image forming apparatus to the log storage server by using the destination information and the authentication information in accordance with reception of the transmission instruction for the second piece of operation information when the determination unit determines that the second piece of operation information is to be transmitted to the log storage server.

2. An image forming apparatus according to claim 1, wherein the notification unit notifies the management server of cancellation when transmission of the second piece of operation information is cancelled.

3. An image forming apparatus according to claim 1, wherein the log storage server comprises a WebDAV server.

4. An image forming apparatus according to claim 1, wherein the first piece of operation information comprises counter information and an alarm log.

5. An image forming apparatus according to claim 1, wherein the transmission unit is further configured to:

attempt a connection to the log storage server by a first authentication method when the second piece of operation information is transmitted; and connect to a server device by a second authentication method when the connection fails by the first authentication method.

6. An image forming apparatus according to claim 5, the first authentication method comprises a digest authentication; and the second authentication method comprises a basic authentication.

7. An image forming apparatus according to claim 1, wherein the transmission unit changes a number of files of the second piece of operation information to be transmitted to the log storage server depending on the link speed.

8. An image forming apparatus according to claim 1, wherein the transmission unit inhibits the second piece of operation information from being transmitted when a number of files of the second piece of operation information generated by the image forming apparatus within a specific period does not exceed a threshold value.

9. An image forming apparatus according to claim 8, wherein the reception unit receives the threshold value from the management server.

10. The image forming apparatus according to claim 1, wherein the transmission unit is further configured to control a transfer rate so that the transfer rate is prevented from exceeding a predetermined value when the second piece of operation information is transmitted.

11. A control method carried out in an image forming apparatus, which is configured to communicate to/from a management server for managing operation information on multiple image forming apparatus, the method comprising:

transmitting a first piece of operation information of the image forming apparatus to the management server in accordance with a schedule set by the management server;

a reception step of receiving from the management server (a) a transmission instruction for a second piece of operation information, (b) destination information on a log storage server to which the second piece of operation information is to be transmitted, the log storage server being different from the management server, and (c) authentication information;

determining in accordance with a link speed with respect to the log storage server whether or not the second piece of operation information is to be transmitted to the log storage server;

notifying the management server of an error when it is determined in the determining that the second piece of operation information is not to be transmitted to the log storage server; and transmitting the second piece of operation information of the image forming apparatus to the log storage server by using the destination information and the authentication information in accordance with reception of the transmission instruction for the second piece of operation information when it is determined in the determining that the second piece of operation information is to be transmitted to the log storage server.

12. A non-transitory computer-readable storage medium storing a computer program for controlling a computer to execute the program according to claim 11.

* * * * *